United States Patent
Benaissa et al.

(10) Patent No.: US 10,414,675 B2
(45) Date of Patent: Sep. 17, 2019

(54) SYSTEM AND PROCESS FOR IN SITU ELECTROCHEMICAL TREATMENT, FOR CAPTURING POLLUTANTS, SEDIMENTATION AND CLEANUP OF CONTAMINATED MARINE SITES

(71) Applicant: GEOCORAIL, Marseilles (FR)

(72) Inventors: Brahim Benaissa, St Sulpice (FR); Nicolas Verjat, Marseilles (FR); Marc Lansard, Crac'h (FR)

(73) Assignee: GEOCORAIL, Marseilles (FR)

( * ) Notice: Subject to any disclaimer, the term of this patent is extended or adjusted under 35 U.S.C. 154(b) by 362 days.

(21) Appl. No.: 15/102,599

(22) PCT Filed: Dec. 1, 2014

(86) PCT No.: PCT/FR2014/053098
§ 371 (c)(1),
(2) Date: Jun. 8, 2016

(87) PCT Pub. No.: WO2015/086948
PCT Pub. Date: Jun. 18, 2015

(65) Prior Publication Data
US 2016/0311703 A1      Oct. 27, 2016

(30) Foreign Application Priority Data

Dec. 13, 2013   (FR) ...................... 13 62617

(51) Int. Cl.
*B09C 1/08*      (2006.01)
*C02F 1/463*     (2006.01)
(Continued)

(52) U.S. Cl.
CPC .............. *C02F 1/463* (2013.01); *B09C 1/085* (2013.01); *C02F 11/006* (2013.01);
(Continued)

(58) Field of Classification Search
CPC ........ B09C 1/085; C02F 11/006; C02F 1/463; C02F 2103/08; C02F 2201/4614; C02F 2209/008
See application file for complete search history.

(56) References Cited

U.S. PATENT DOCUMENTS

| 4,246,075 A | 1/1981 | Hilbertz |
| 5,543,034 A | 8/1996 | Hilbertz et al. |

(Continued)

FOREIGN PATENT DOCUMENTS

| FR | 2 882 279 A1 | 8/2006 |
| WO | 2005/047571 A2 | 5/2005 |

(Continued)

OTHER PUBLICATIONS

Matsumoto et al.: "Case study of electrochemical metal removal from actual sediment, sludge, sewage and scallop organs and subsequent pH adjustment of sediment for agricultural use", Water Research, Elsevier, Amsterdam, NL, vol. 41, No. 12, May 22, 2007 (May 22, 2007), pp. 2541-2550, XP022088226, ISSN: 0043-1354, DOI:10.1016/J.WATRES.2007.03.024 the whole document.

(Continued)

*Primary Examiner* — Salil Jain
(74) *Attorney, Agent, or Firm* — Young & Thompson

(57) ABSTRACT

Process for capturing and cleaning up pollutants by the formation of cement or concrete by electrolysis, the creation of a rocky conglomerate, assembly of sediments linked together by a calcium-magnesium deposit acting as binder. This process is thus applicable to the decontamination of ports, by enabling the capture of pollutants and by containing them in a sediment matrix.

8 Claims, 1 Drawing Sheet

(51) Int. Cl.
*C02F 11/00* (2006.01)
*C02F 103/08* (2006.01)

(52) U.S. Cl.
CPC .. *C02F 2103/08* (2013.01); *C02F 2201/4614* (2013.01); *C02F 2209/008* (2013.01)

(56) References Cited

U.S. PATENT DOCUMENTS

| | | | |
|---|---|---|---|
| 5,865,964 | A | 2/1999 | Clarke et al. |
| 2005/0230268 | A1* | 10/2005 | Elgressy ................ C02F 1/463 205/701 |
| 2010/0024686 | A1* | 2/2010 | Constantz .......... B01D 53/1425 106/817 |
| 2010/0332149 | A1* | 12/2010 | Scholpp ................. C02F 1/008 702/25 |
| 2013/0199931 | A1* | 8/2013 | Rath .................... B01D 61/445 204/533 |

FOREIGN PATENT DOCUMENTS

| | | | | |
|---|---|---|---|---|
| WO | WO-2005047571 | A2 * | 5/2005 | ............. C04B 32/02 |
| WO | 2008/135987 | A2 | 11/2008 | |
| WO | WO-2008135987 | A2 * | 11/2008 | ............. C02F 1/469 |

OTHER PUBLICATIONS

International Search Report, dated Jan. 30, 2015, from corresponding PCT application.

* cited by examiner

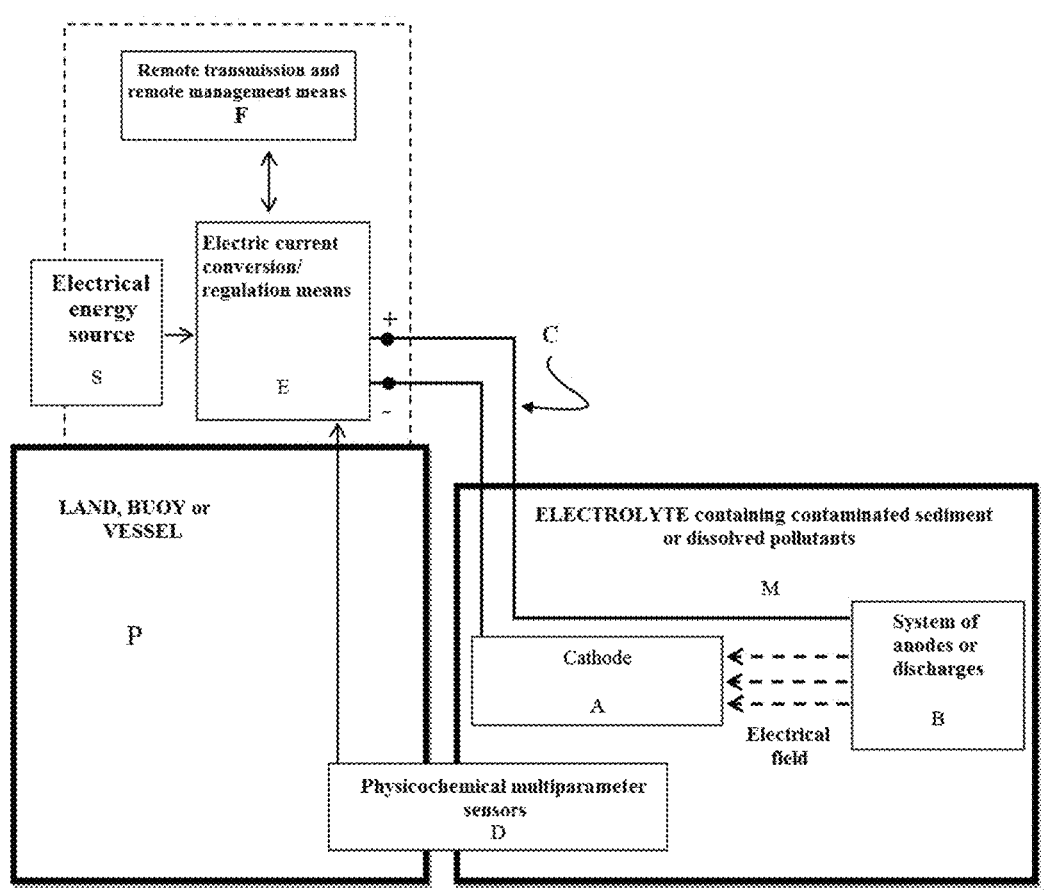

SYSTEM AND PROCESS FOR IN SITU ELECTROCHEMICAL TREATMENT, FOR CAPTURING POLLUTANTS, SEDIMENTATION AND CLEANUP OF CONTAMINATED MARINE SITES

The present invention relates mainly to a system and method for the depollution of an aquatic or wet environment, in particular fresh, sea or briny water and wetlands, and the confinement of pollutants.

When it is wished for example to maintain a sufficient draught of water in a port, dredging is carried out. However, because of the operating conditions of a port, the materials thus removed from the bed are often loaded with pollutants, in particular heavy metals. In the past, the dredged materials were discharged offshore, which merely moved and spread the pollution. It is now necessary to treat and depollute the materials thus removed before discharging them into nature. Such a treatment requires settling and lengthy and expensive methods, with very low efficiency; furthermore, the treatment systems occupy a large amount of space on the quays and in the vicinity of the port. There is therefore a situation where there is no satisfactory treatment, and some ports are silting up while awaiting a satisfactory solution.

The purpose of the invention is in particular to propose a system and method for depolluting an aquatic or wet environment, in particular fresh, sea or briny water and wet or muddy land, and the confinement of pollutants, which in particular can be used when dredging a port or a watercourse.

According to the invention, such a system for depolluting an aquatic or wet electrolytic environment is characterised in that it comprises:
 a conductive metal structure forming a cathode, disposed in said electrolytic environment;
 an anode in the electrolytic environment, at a certain distance from the cathode;
 an electrical circuit to which said cathode and said anode are connected;
 preferably, an electric current source for supplying the electrical circuit;
 physicochemical measurement sensors for controlling chemical changes and kinetics in said environment;
 means for regulating the current so as to selectively obtain conditions favourable to the formation of a conglomerate on said cathode, said regulations being slaved to the measurements by said sensors and by apparatus for measuring electrical parameters in said circuit, in particular current, voltage, power and/or frequency;
 remote monitoring and/or remote management means, enabling the system to be managed remotely.

The remote monitoring and/or remote management means advantageously allow remote monitoring, the sending of alarms and historisation by storing parameters in a database.

The conductive metal structure forming a cathode may comprise a canvass formed by metal fibres and/or a mixed weaving of conductive fibres with non-conductive fibres, so that it can easily be extended over a seabed in particular.

According to another subject matter of the invention, a method for depolluting an aquatic or wet electrolytic environment is characterised in that it comprises the following steps:
 a conductive metal structure forming a cathode is disposed in said electrolytic environment;
 an anode is disposed in the electrolytic environment, at a certain distance from the cathode;
 an electrical circuit is provided, to which said cathode and said anode are connected;
 said electrical circuit is supplied by an electrical system composed of a self-contained or connected source of electric current;
 multiparameter physicochemical measurement sensors are positioned in the environment or in land close-by, which make it possible to monitor chemical changes and kinetics in said environment;
 means are provided for regulating the current so as to selectively obtain conditions favourable to the formation of a conglomerate; these regulations being slaved to the measurements made by the sensors and by apparatus for measuring electrical parameters in said circuit, in particular current, voltage, power and/or frequency;
 the whole is coupled to remote monitoring and/or remove management means, enabling the system to be managed remotely.

The metal structure forming a cathode is advantageously designed and disposed so that the conglomerate forms an in-situ confinement, so that the contaminating materials thus confined cannot be put back in suspension in the environment, making it possible to leave them submerged by inoculating them in situ.

Instead of remaining in situ, the metal structure forming a cathode may be removed from the environment, after formation of the conglomerate. The conglomerate can then be used as a recyclable material, in particular for construction, the foundation of a building, or a roadway.

A block formed by the conglomerate may be coated with a vitrifying resin, in particular to prevent salting out of some of the pollutants and/or to stop biasing of the block.

A method according to the invention may be used for depolluting sludge, in particular by adding to the sludge at least one substance for stabilising it in the form of a solid material and/or for enabling the colloids that this sludge contains to coagulate and flocculate together, to facilitate aggregation thereof in the matrix binding the sediments that this sludge contains.

A method for restoring a seabed may comprise steps for depolluting this bed by a method according to the invention, and furthermore at least one step for stabilising this bed.

A method for capturing $CO_2$ may also advantageously comprise the steps of a depollution method according to the invention.

A plurality of embodiments of the invention will be described below, by way of non-limitative examples, with reference to the accompanying drawings, in which:
 the single FIGURE is a schematic view illustrating a method according to the invention.

It is known, in particular from the document WO 2005/047571, that the metal structure forming the cathode part of an electrolysis system, in contact with the marine or briny aqueous environment, is covered with a deposition of salts, referred to by the specialists as "calco-magnesian", caused by the precipitation on this structure of compounds, in particular $CaCO_3$ (calcium carbonate) and $Mg(OH)_2$ (magnesium hydroxide), by the combination of ions issuing from elements (Ca, Mg) and gaseous ions ($CO_2$, $O_2$) dissolved in an electrolytic environment (seawater or conductive terrain or in briny water in lagoons). The system according to the invention uses this principle and develops a control process for aggregating the sediments of all kinds around this deposition.

As illustrated in the FIGURE, the invention relates to a system and method for forming a binder for binding sediments together, specifically intended for neutralising pollutants, in an electrolytic environment M comprising mineral, metallic or gaseous elements, whether in suspension, dissolved or deposited. This method comprises steps for:

disposing a conductive metal structure A forming a cathode in the electrolytic environment M;

disposing an anode B in the electrolytic environment M, at a certain distance from the cathode A;

providing an electrical circuit C to which the cathode A and the anode B are connected;

supplying the electrical circuit C by means of an electrical system composed of an electric current source S that is self-contained or connected to an electrical supply network or a regulation system for generating a regulated continuous electric current;

positioning, in the electrolyte or in the land close-by, multiparameter physicochemical measuring sensors D that make it possible to monitor the chemical changes and kinetics in the environment M;

providing means E for regulating the current so as to selectively obtain conditions favourable to the chemical reactions; these regulations are slaved to the measurements made in situ by the sensors D and by the apparatus for measuring the electric current (intensity, voltage, power, frequency, etc.);

coupling the whole to remote monitoring and/or remote management means F, enabling the system to be managed remotely; these means allow in particular remote monitoring, the sending of alarms and historisation by storage of parameters in a database.

In the example illustrated, the energy source S, the means for converting and regulating the current E and the remote monitoring and remote management and/or remote monitoring means are installed on a platform P. This platform may be:

a terrestrial platform, for example a quay at a port, a buoy; or a boat, in particular when the method is implemented offshore.

The cathode A, that is to say the negatively biased structure, may, according to circumstances, consist of:

a grille made from bare black steel, galvanised or not, copper plated in whole or in part or not, covered or not with a metal or metal oxides with suitable electrochemical potentials, expanded or perforated metal with the same constitution as the above grille, an assembly of metal lattices, forming enclosures in which sediments at various granulometries will have been able to be disposed. This cell may have various forms, for example may be cubic, rectangular, slender, cylindrical, in a bag, comprising polyhedrons with multiple facets, or composed of a single or a plurality of components; various faces of a cell may be electrically connected together by welding, brazing, clamping, screwing or mechanical connection, but preferably manufactured from a continuous mesh frame; identical arrangements are made to connect a plurality of metal cells together, preferably so that this connection is easy to implement in large numbers, and ensures good electrical continuity; preferably, the mechanical connections and the electrical connections are separated so that each fulfils its own function;

a metal micropost, for example used also for supporting structures installed on unstable bases;

an anchor bolt for reinforcing maritime quays in sheet piles;

a metal needle or one made from conductive material, in the form of a comb or rake, links, hooks or eyebolts, intended to facilitate the overhead attachment of the cathodic structures to cliffs and rocks or to artificial structures to be consolidated; or a combination of the various aforementioned cathodic and geometric structures, each in one or more examples.

According to the result sought, the various aforementioned cathodic structures, whether they are overhead (in a tidal zone) or submerged, may be either:

bare, balanced or fixed by mechanical connecting members of the nail, sand auger or tie rod type for anchoring to the sediment environment that is the subject of the depollution;

or:

with a predeposition of calco-magnesian deposit obtained in the workshop, in the laboratory, in the factory, or in a river or maritime site for preparing the support on which the metal part is already covered with a deposition completely or partially covering the metal part;

or:

covered on one side, or both sides, with an envelope that is permeable to water but semi-sealed so as to not allow its content to be filtered. This envelope is produced from natural or synthetic fibres, woven or not, reinforced or not with metal fibres or the like, forming for example a sandwich around the cathodic structure like a thin cover. It is able to be filled, partly or completely, with a ballast formed from the sediments to be neutralised, intended to agglomerate with the mixture of calcium carbonate, magnesium hydroxide, silicates, aluminates and other salt ions, in particular ferrous, deposited naturally on the cathodic structures of the system through the effect of the biasing currents imposed by the method according to the invention;

or:

in the form of a mixed fibre/metal material, consisting of metal fibres alone or mixed with non-conductive natural or synthetic textile fibres, in the weave of which conductive fibres are interposed, which may give rise to the cathodic reactions necessary to the synthesis of the conglomerate.

The support giving rise to the reaction may be produced so as to be fixed in various positions vis-à-vis the environment:

Placing fixedly on the substrate of the seabed, or submerged at half depth in the water.

Placing perpendicular to the water current like a sieve and continuously filtering the seawater.

Positioned like an electrochemical filter, adaptable for example to a circuit for discharging the waste water from industrial centres, etc.

A system according to the invention may also comprise mobile self-contained means, such as a drone that moves autonomously over the seabed of ports, comparable to the principle of the swimming pool aspirator, but which, for this application, continuously captures polluting particles. The captor drone is advantageously rechargeable autonomously on a terminal supplied with energy, preferably renewable, for example by means of the swell.

Preferably, the cathodic structure is designed so that it is possible to take samples during the formation of the conglomerate. These intermediate samplings, carried out periodically, make it possible to confirm the correct parameterising of the installation and the functioning of the capture.

The samplings may be carried out:
by sampling the test pieces previously installed on the structure, secured to the structure or not;
by core sampling at isolated points in the conglomerate formed.

The system may comprise one or more anodes B, disposed in the salty environment, soil or sea, close to each cathode. Each anode fulfils the role of current outlet, to allow electrical biasing of the cathodic supports.

The anodes may be metal masses positioned in a star, or connected together forming a collar. A cable anode may also be chosen to fulfil the same role. The position of the anodes is determined suitably on each site, taking account of the geometric characteristics of the anode and the electrochemical characteristics of the environment.

The system may comprise one or more electrical energy sources S; they may be of any nature, self-contained, embedded or connected to a terrestrial energy distribution network. Renewable energies are favoured when their compatibility is established.

Among the usable sensors D already known from the prior art, some may be sensors for measuring the compactness or hardness of the conglomerate, the composition of the constituents of this conglomerate, or the number and nature of the contaminants or chemical, mineral or biological element marking pollution that forms part thereof.

The choice of parameters to be measured for the regulation is variable according to the site to be depolluted. A diagnosis has to be made on a case by case basis; for example, a campaign for measuring a plurality of parameters may make it possible to select the parameters giving regulation indices that are the most representative of the site.

Sensors D are positioned so as to measure the pollutants:
either in the electrolyte M in which the cathode A is immersed;
or in the immediate vicinity of the cathode, so that, once the conglomerate is formed, a sensor is gripped actually inside the aggregate, and gives information on the pollutant situated inside the material itself.

Sealed sensors used may be either connected to the regulation means by cable or be equipped with a self-contained power supply and transmit the information collected by electromagnetic waves used for the purpose of transmissions at short, medium or long distances.

The means for conversion and regulation of the electric current E make it possible to control and regulate the process of formation and maintenance over time of the material capturing pollutants, during these periods. The functioning of the regulation system of the process will be slaved to the result of the measurements made by the sensors D installed for detecting the physicochemical parameters required. The regulating assembly will be able to take the form of embedded electronics, controlled by parameterising programmed locally or remotely.

The choice of the settings of the regulation, such as the current density or the potential of the structure, according to the variables measured in the environment M, makes it possible to precipitate preferentially one type of ion in particular in order firstly to facilitate the operation of sorting and recycling and secondly to optimise the kinetics of the depollution operation. The variables measured in the environment M may be a chemical composition of the water of the environment M, its temperature, its acidity, or an indication of the presence of a pollutant or of a given element in the environment M.

The remote management and/or remote transmission means F advantageously comprise telecommunication means. Thus all the current control, conversion and regulation means may be connected to an operational unit for control or recording of information connected via a telephone network or Internet, by radio waves or in wavelengths authorised for the transmission of information, making it possible to monitor or control the system remotely. These means may further be coupled to an electricity meter metering the power consumed by the insulation, in order to record the consumptions remotely (remote control).

For implementing the method according to the invention, it is possible to make provision:
either for generating the conglomerate by capturing it in situ and leaving it there, for the purpose of confinement and neutralisation of the pollutants on site. The material thus agglomerated will form a rigid shell around the polluted sediment to be confined;
or for generating the capturing material in situ, in the form of concretion, for the purpose of bringing out the concretion of sediments thus formed and enclosing the pollutants, for reuse of the material, the conglomerate of sediments that forms the subject of the treatment;
or for performing the same operation on a site, the purpose of which is not necessarily depollution, but only the extraction of non-contaminated sediments, and for which this electrolytic method constitutes a simple alternative to the traditional dredging method. In this case, it is considered to be easier and more advantageous to remove the blocks of capturing conglomerate from the aquatic environment, in order to facilitate dredging, than by means of mechanical, hydraulic or mixed methods or other traditional form of dredging in bulk; in particular such conglomerates are substantially devoid of water, no longer needing lengthy settling in bulky basins.

This electrolytic method is implemented by immersing a cathodic structure A in the zone to be treated. This structure is positioned either placed on the seabed or immersed in a muddy zone, where there is sediment to be agglomerated. Suitably disposed on the surface of or above the sediment, the cathode A fulfils a role of shell trapping the soft sediment, liable to be put back in suspension in the environment, not yet agglomerated, for example during choppy events, or when vessels with a deep draught pass, disturbing the currentology in the seabed, or put back in suspension by simple thermal gradient due to the movements of masses of water between the surface and the bottom of the aqueous medium. A crust of conglomerate thus formed prevents the bottom sludge that is liable to release, at each cycle, contaminants in the water situated closest to the surface, from being put back in suspension, these moved contaminants being liable to reach the trophic chain of the ecosystem. Such a shell may be removed or left in place.

The cathodic structure A may be immersed more deeply in the cloudy zones that give rise to settling in seabeds.

When the duration of implementation of the method has been sufficiently long for the conglomerate to reach a desired size, the conglomerate thus formed may be removed from the water by lifting by crane from the quay in the case of a port or by means of a suitable barge. If the cathode is being positioned simply by ballasting, the crane will have to have sufficient capacity to lift the structure covered with the capturing conglomerate thus formed, as well as the original ballasts. A slinging device may be held in place throughout the duration of the operation or a diver is provided for anchoring the structure.

If the structure has been fixed to the seabed by a mechanical fixing method, for example a sand screw, an anchoring tie rod or nails: either a crane of sufficient capacity is used in order to overcome the mechanical strength of the anchoring device, or a diver, or an equivalent onboard mechanical system, can shear the anchorings, before the lifting operation. As far as possible, the anchoring is designed so that it can be disconnected from the cathodic structure and the anchoring is not necessarily the seat of the electrolytic reaction forming the conglomerate. As soon as the block of capturing material is removed from the aquatic environment, it is loaded into a barge or lorry. This operation and the transport are facilitated by the mechanical strength of the structure, unlike the conventional transport in bulk of sediment resulting from dredging.

The interstitial water present in the material is present in small quantities. The segregation operation is consequently relatively rapid, and the density of the material after a few hours out of water is very quickly close to the real density of the dry material. This speed has a certain advantage in the logistic chain of reuse of the material. The material may be washed in fresh water in order to eliminate the sulfates and chlorides due solely to the interstitial water, and thus to reduce the sulfate and chloride content of the residual material.

The size of the cathodic structures is advantageously adapted according to any reuse planned for the conglomerate that will be formed therein. It is thus possible to obtain, in a single piece, a conglomerate from a few kilograms to several hundreds of tonnes.

The electrochemical method also allows capture of carbon dioxide ($CO_2$) dissolved in the environment M. This trapping causes a shift of the gaseous equilibrium to the liquid atmosphere interface. The $CO_2$ deficit in the environment causes an increase in pH, and therefore a reduction in the acidity of the environment, and a shift of the calco-carbonic equilibrium. The aquatic environment M returns towards its equilibrium by capturing atmospheric $CO_2$, thus contributing to a reduction in the $CO_2$ present in the atmosphere. In addition to this trapping of $CO_2$, the depollution of the site and the implementation of the method contributes to an ecological restoration of the marine environment, by consolidating a substrate propitious to the establishment of undersea flora, and, in the case of species compatible with electrochemical stimulation, biological growth proves to be stimulated and accelerated by the method according to the invention.

The conglomerate obtained by the depollution method according to the invention can be recycled.

When the capturing material formed is removed from the aquatic environment, it is subjected to the same regulations as any sediment extracted from an aquatic bed. The same regulatory analyses can be made thereto and the same purposes permitted by technology and regulations can be envisaged and applied. The capturing material, that is to say the conglomerate resulting from the method used, once characterised in terms of strength, composition, stabilisation and innocuousness of the pollutants, can therefore be directed to the various channels allowed by the regulations. According to the results of analyses of physicochemical composition, leaching-out and percolation tests, and other specific studies for characterising the material, it can be reused in backfill for the construction of roads, covered or not with a surfacing or covered or not with a top layer of another duly authorised material, or reused in the raw state in construction, rehabilitation, restoration or renovation of land, sea, river or undersea structures. The capturing material thus formed is a way of recycling dredging sediments, characterised by true recycling allowing the use of materials, and not a simple dilution of the polluting agents combined with other elements, simply to reduce the concentrations thereof in the environment.

The method can in particular make it possible to reclassify the material as a less harmful waste, making it change from the status of "hazardous non-inert material" to "non-hazardous non-inert material" or "inert material".

Once mechanically and chemically characterised and declared without chemical or ecotoxicological risk, the capturing material can join the recycling channels intended for dredging sediment such as refilling of beaches or central reservations, use in backfill in building or civil engineering, construction materials, agricultural spreading, re-immersion for forming artificial reefs, tripods or dyke riprap.

With a view to recycling thereof, the material resulting from this electrolytical process can undergo a chemical treatment, for example acid treatment for dissolution of the calco-magnesian binder. It may also undergo heat treatment for extracting and processing the various metal alloys.

According to the concentrations of metal elements, the physical properties of the material issuing from this method may be exploited by recycling:

If its density is high:
creation of ballast or a deadman for anchoring or stabilising an infrastructure.

If its electrical conductivity is greater than that of a conventional substitute material:
backfill for foundation and ground situated around earthing and lightning rod connections for assisting the discharge to earth of the electrical energy from lightning or short-circuit;
backfill for foundation and sub-soil situated under railway or tramway rails to limit the diffusion of stray currents and draining them through more conductive ground;
creation of conductive ground for the passage of underground or surface electric current in order for example to protect a closed space against any intrusion or to count a number of passages;
creation of a conductive ground for stimulating, by electric fields or small low-amperage electric shocks, the growth of plants or the development of species situated therein.

If its thermal inertia allows the accumulation of heat:
materials for constructing house slabs in order to improve the thermal inertia of the domestic heating and therefore the comfort of the house;
underground cavity foundation and backfill used for storing until winter the water heated in summer by the accumulation of heat issuing for example from the heating of black concrete on roads;
radiating rock for infrared marking of camouflage military action sites.

If its thermal conductivity is greater than that of a conventional substitute material:
backfill for foundation thermally stressed by high energy contributions to be diffused (rocket launch platform, factory subsoil/foundation with heat treatments (blast furnaces, etc.).

If it is impermeable to electromagnetic waves:
material for forming a jamming shield aimed at isolating chambers against leakages of electromagnetic waves caused by human or machine electronic activities.

Various contaminants or pollutions may be captured and utilised by the method according to the invention and trapped in the capturing conglomerate and may be of all forms and types.

The chemical elements are captured by two mechanisms made possible by the constructional arrangements presented above:

Firstly, the capture of dissolved chemical elements and molecules. These dissolved elements are precipitated electrochemically. The precipitate in solid form thus obtained is then agglomerated with the material, and with the calco-magnesian binder. The electrical field facilitates the movement of the ions and other charged particles, which orient along the fixed field lines and polarity.

Secondly, the capture of fixed contaminants, absorbed or adsorbed on the surface of said sediments. It is the sedimentation of these polluted materials in the conglomerate bound by calco-magnesian cement that makes it possible to capture and trap this type of contaminant.

The material agglomerates the compounds naturally present in the sediment. All the metals and their associated metal oxides, trace elements of chemical elements well known in the periodic classification, in particular those the presence of which in a natural environment is monitored in the search for contaminants, in particular arsenic, cadmium, chromium, copper, mercury, nickel, lead, zinc, molybdenum, antimony and selenium.

The following may also be trapped by the method: all the elements resulting from synthesis chemistry, derived or not from hydrocarbons, in particular used as maintenance or treatment products, detergents, pesticides, medicines, metabolisers, anti-fouling products, biocides, drugs, flocculants, coagulants, lubricants; in particular those the presence of which in the natural environment is monitored in the search for contaminants, such as TBT (tributyltin), PAHs (polycyclic aromatic hydrocarbons), PCBs (polychlorinated biphenyls) normally identified as well as all congeners and derivatives thereof, endocrine disrupters, and all pollutants classified as forming part of CMRs (carcinogenic, mutagenic and toxic for reproduction).

In addition to chemical elements, autotrophic living organisms are able to be trapped in the matrix of the conglomerate. Given the site of use of the method, in a polluted zone, these living organisms are contaminated by the pollutants and trapping thereof also represents protection of the environment by preventing their entering the food chain, thus contaminating other species.

The sediment aggregated by this electrochemical method may in particular be:
sacrificial anode residues;
metallic particles, oxidised or not, issuing from the decomposition of port infrastructures (sheeting, debris, concrete reinforcement, infrastructures, etc.);
radioactive waste issuing from nuclear power stations in a solid aggregate composed of material limiting radioactive radiations. Neutralisation treatment before secure storage;
radioactive metal particles dissolved in seawater;
residues issuing from oil slicks;
microparticles contained in hydrocarbons, thus making it possible to limit the release of microparticles into the atmosphere during the combustion of a fuel in thermal engines.

Naturally the invention is not limited to the examples that have just been described.

Thus the cathodic structure may be either simply ballasted in order to rest on the bottom, or anchored via sand screws or anchoring tie rods or studding or chemical pins, directly or by means of metal straps or strips.

Furthermore, the invention makes it possible to promote, while controlling and regulating it, the formation of an aggregate, intended for the capture and depollution of sea-beds, river beds or wetlands in:

ports, coves, creeks, inlets, bays, harbours, rivers, watercourses, ponds, lagoons or lakes where the sediment resting on the bottom is liable to accumulate and have contamination;

offshore sites, islands or artificial structures, the establishment of which by humans has been able to generate on site any pollution, of such a nature as to destabilise the local sedimentary, chemical and biological equilibrium;

any site that conventionally has a need to be depolluted by a dredging operation and for which the present invention may constitute a substitute process by treating all or part of the problem in situ, before extraction and opening up to the atmosphere of the sediment in question, by removing it from its undersea environment;

any site where the need is not necessary to remove the pollution but where the objective sought is to confine it at the actual place where it is situated, preventing its being put in suspension, neutralising it and making it inert, or at least reducing its harmful impact on the environment;

any site where the objective sought is the stabilisation of the sedimentary bed in a solid base, and for which the dual aim sought is the capture of the pollutants;

any site that is not yet or only a little polluted, but for which the system is put in place, preventing future pollution, or to facilitate the subsequent analysis of the historically superimposed sedimentary layers, thus trapped in a pollution marker;

any industrial, agricultural, urban or tourist site generating flows of water that are highly polluted and containing in particular heavy metals requiring the capture of coarse particles or ones dissolved in the electrolyte in order to conform to current legislation, filtering the flows in order to ensure the quality of the activities downstream, limiting rejection and losses of material or even improving the economic efficacy of the method;

any retaining of water, sea, lagoon or streams surrounding mining extraction sites or the channeling of the discharge of water used for the extraction or rinsing of extraction tools in nickel, gold, etc. mines;

any gas or petroleum extraction site generating flows of water or sludge heavily loaded with sediment, mud, clay and polluting oil-bearing residues or other heavy sediments that are difficult to separate from water by traditional methods such as settling or filtering etc.

The method according to the invention is applicable to the depollution of sites for which simple dredging no longer constitutes an economically advantageous solution because of the cost of removing the dredging sludge and sediment.

The method according to the invention, which allows the formation of the electrolytic material serving for capture, employed alone or in combination with other depollution methods, assists and makes it possible to control, in their various phases, the formation, setting and progressive development of the material on a light grille or any other type of cathodic system immersed on the site in question. It thus becomes possible, in a single method, to:
neutralise pollutants,
stabilise the sedimentary base,
capture $CO_2$,
consolidate the seating of river or maritime structures, restore an undersea bed via a multiscale granulometry suited to the various types of living organisms, in order to serve as a nursery or refuge against predators.

The invention claimed is:

1. Method for depolluting an aquatic or wet electrolytic environment, which comprises the following steps:
   disposing a conductive metal structure forming a cathode in said electrolytic environment;
   disposing an anode in the electrolytic environment, at a certain distance from the cathode;
   providing an electrical circuit, to which said cathode and said anode are connected;
   supplying said electrical circuit by a source of electric current and providing an electrical potential to the anode and the cathode;
   positioning multiparameter physicochemical measurement sensors in the electrolytic environment or in terrain close by, which make it possible to monitor chemical changes and kinetics in said environment;
   providing a regulating assembly in the form of an electronic circuit for regulating the current so as to selectively obtain conditions favorable to the formation of a conglomerate on the cathode; these regulations being slaved to the measurements made by the sensors and by apparatus for measuring electrical parameters in said electrical circuit;
   coupling a regulating assembly in the form of an electronic circuit for regulating the current and the multiparameter physicochemical measurement sensors to remote monitoring and/or remote management means, enabling the system to be managed remotely; and
   removing the metal structure forming the cathode from the environment after the conglomerate is formed.

2. Method according to claim 1, wherein the remote monitoring and/or remote management means allow remote monitoring, the sending of alarms and historization by storage of parameters in a database.

3. Method according to claim 1, wherein at least one sensor is disposed in the immediate vicinity of the cathode so that, once the conglomerate is formed, said sensor is held actually inside said conglomerate, and gives information on the pollutants situated inside said conglomerate.

4. Method according to claim 1, wherein the conglomerate is used as a reprocessable material, for building structures, a building foundation or a roadway.

5. Method for depolluting an aquatic or wet electrolytic environment, which comprises the following steps:
   disposing a conductive metal structure forming a cathode in said electrolytic environment;
   disposing an anode in the electrolytic environment, at a certain distance from the cathode;
   providing an electrical circuit, to which said cathode and said anode are connected;
   supplying said electrical circuit by a source of electric current and providing an electrical potential to the anode and the cathode;
   positioning multiparameter physicochemical measurement sensors in the electrolytic environment or in terrain close by, which make it possible to monitor chemical changes and kinetics in said environment;
   providing a regulating assembly in the form of an electronic circuit for regulating the current so as to selectively obtain conditions favorable to the formation of a conglomerate on the cathode; these regulations being slaved to the measurements made by the sensors and by apparatus for measuring electrical parameters in said electrical circuit;
   coupling a regulating assembly in the form of an electronic circuit for regulating the current and the multiparameter physicochemical measurement sensors to remote monitoring and/or remote management means, enabling the system to be managed remotely, wherein the conglomerate is coated with a vitrifying resin, to prevent re-salting of part of the pollutants.

6. Method for depolluting an aquatic or wet electrolytic environment according to claim 1, wherein the aquatic or wet electrolytic environment comprises a sludge loaded with sediment, mud, clay, polluting oil-bearing residues or other heavy sediments wherein at least one substance is added to the sludge for stabilizing said sludge as a solid material, or for making it possible to coagulate and flocculate colloids with each other, to facilitate the aggregation of these colloids in the conglomerate binding the sediment.

7. Method
   which comprises the following steps:
      disposing a conductive metal structure forming a cathode in a seawater constituting an electrolytic environment and surrounding a seabed;
      disposing an anode in the electrolytic environment, at a certain distance from the cathode;
      providing an electrical circuit, to which said cathode and said anode are connected;
      supplying said electrical circuit by a source of electric current and providing an electrical potential to the anode and the cathode;
      positioning multiparameter physicochemical measurement sensors in the electrolytic environment or in terrain close by, which make it possible to monitor chemical changes and kinetics in said environment;
      providing a regulating assembly in the form of an electronic circuit for regulating the current so as to selectively obtain conditions favorable to the formation of a conglomerate on the cathode; these regulations being slaved to the measurements made by the sensors and by apparatus for measuring electrical parameters in said electrical circuit;
      coupling the means for regulating the current and the multiparameter physicochemical measurement sensors to remote monitoring and/or remote management means, enabling the system to be managed remotely,
   the conductive metal structure forming the cathode being disposed on the seabed in order to stabilize said seabed.

8. Method according to claim 2, wherein at least one sensor is disposed in the immediate vicinity of the cathode so that, once the conglomerate is formed, said sensor is held actually inside said conglomerate, and gives information on the pollutants situated inside said conglomerate.

* * * * *